US012623544B2

(12) United States Patent
Gage

(10) Patent No.: US 12,623,544 B2
(45) Date of Patent: May 12, 2026

(54) GENERATIVE ARTIFICIAL INTELLIGENCE AND COHESIVE EXPERIENCE FOR AUTOMOTIVE APPLICATIONS

(71) Applicant: Toyota Motor North America, Inc., Plano, TX (US)

(72) Inventor: Sergei Gage, Dallas, TX (US)

(73) Assignees: TOYOTA MOTOR NORTH AMERICA, INC, Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 18/529,813

(22) Filed: Dec. 5, 2023

(65) Prior Publication Data

US 2025/0178439 A1 Jun. 5, 2025

(51) Int. Cl.
    *B60K 35/81* (2024.01)
    *B60R 16/037* (2006.01)
    *G06F 9/451* (2018.01)

(52) U.S. Cl.
    CPC ............ *B60K 35/81* (2024.01); *B60R 16/037* (2013.01); *G06F 9/451* (2018.02)

(58) Field of Classification Search
    CPC ...... B60K 35/81; B60K 35/235; B60K 35/70; B60K 35/00; H04L 9/40; H04L 67/1095; B60Q 3/18; G06F 3/147; G06F 3/1423; G06F 3/1454; G06F 3/14; G06V 40/19; G09G 5/10; G07C 5/008; B60R 1/12; B60R 16/037; B60H 1/00771; A61B 3/113; H03G 3/20; B60W 30/06; E05B 81/70; G06Q 30/0261; H04N 21/4363; G01C 21/3632; H04W 84/18
See application file for complete search history.

(56) References Cited

U.S. PATENT DOCUMENTS

| | | | | |
|---|---|---|---|---|
| 6,480,224 | B1 * | 11/2002 | Brown ..................... | H04L 9/40 |
| | | | | 348/E7.087 |
| 10,108,260 | B2 * | 10/2018 | Park ..................... | G06F 3/0304 |
| 10,223,744 | B2 * | 3/2019 | Brady .................... | G06Q 40/02 |
| 11,518,408 | B2 | 12/2022 | Gonzalez et al. | |
| 12,165,229 | B1 * | 12/2024 | Carroll .................. | G06F 18/214 |
| 2009/0141175 | A1 * | 6/2009 | Hsu ........................ | H04N 23/88 |
| | | | | 348/E9.049 |
| 2014/0037109 | A1 * | 2/2014 | Ban .......................... | H03G 3/20 |
| | | | | 381/107 |

(Continued)

FOREIGN PATENT DOCUMENTS

| | | | | |
|---|---|---|---|---|
| CN | 204425453 U | 6/2015 | | |
| CN | 107408258 A | * 11/2017 | ......... | G06Q 30/0261 |

(Continued)

*Primary Examiner* — Yuri Kan
(74) *Attorney, Agent, or Firm* — Jordan IP Law, LLC

(57) ABSTRACT

Apparatuses, systems, and methods relate to technology to receive first user data from an application and identify that the application is associated with a vehicle. The technology further generates, with a machine learning model, a parameter based on the first user data, where the parameter is associated with a display characteristic that controls a manner that information is presented on a user interface, further where the user interface is associated with the vehicle. The technology further provides the parameter to the vehicle based on the application being associated with the vehicle.

20 Claims, 6 Drawing Sheets

(56)                   References Cited

U.S. PATENT DOCUMENTS

| | | | | |
|---|---|---|---|---|
| 2015/0199006 A1* | 7/2015 | He | .......................... | A61B 3/113 |
| | | | | 345/158 |
| 2016/0347149 A1* | 12/2016 | Rustoni | ............. | B60H 1/00771 |
| 2017/0080801 A1* | 3/2017 | Ogata | ..................... | B60K 35/00 |
| 2017/0129405 A1* | 5/2017 | Oba | .......................... | B60R 1/12 |
| 2017/0168770 A1* | 6/2017 | Zhao | ..................... | H04W 84/18 |
| 2018/0137033 A1* | 5/2018 | Ohmert | .................. | G07C 5/008 |
| 2020/0339157 A1* | 10/2020 | Yurdana | ................ | B60K 35/70 |
| 2021/0142765 A1* | 5/2021 | Malhotra | ................. | G09G 5/10 |
| 2022/0319200 A1* | 10/2022 | Tarayan | ................ | G06V 40/19 |
| 2023/0069348 A1* | 3/2023 | Park | ........................ | G06F 3/147 |
| 2024/0166127 A1* | 5/2024 | Wang | ..................... | B60Q 3/18 |
| 2024/0265835 A1* | 8/2024 | Shiono | ................. | B60K 35/235 |
| 2025/0137798 A1* | 5/2025 | Cummings | ........ | G01C 21/3632 |

FOREIGN PATENT DOCUMENTS

| | | | | | |
|---|---|---|---|---|---|
| CN | 108206836 | A | | 6/2018 | |
| CN | 110847726 | A  * | 2/2020 | ............. E05B 81/70 |
| CN | 113978454 | A  * | 1/2022 | ............. B60W 30/06 |
| CN | 107302592 | B  * | 4/2023 | ......... H04L 67/1095 |
| CN | 202210448601 | A  * | 11/2023 | ........... G06F 3/1454 |
| JP | 2012148750 | A | | 8/2012 | |
| JP | 2013178532 | A | | 9/2013 | |
| KR | 200491440 | Y1  * | 4/2020 | ........... G06F 3/1423 |
| WO | WO-2022092599 | A1  * | 5/2022 | ......... H04N 21/4363 |

* cited by examiner

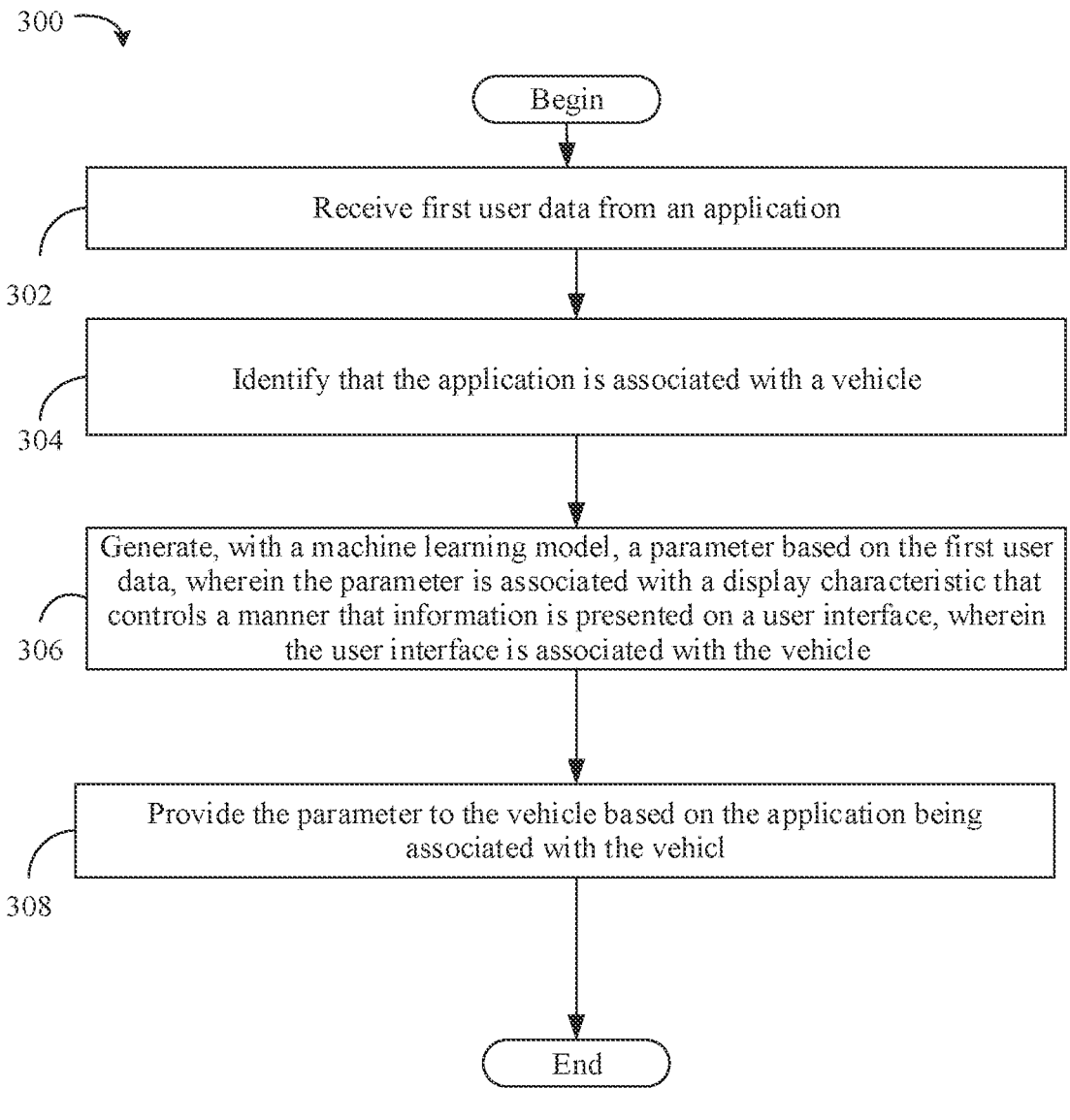

300

Begin

Receive first user data from an application

302

Identify that the application is associated with a vehicle

304

Generate, with a machine learning model, a parameter based on the first user data, wherein the parameter is associated with a display characteristic that controls a manner that information is presented on a user interface, wherein the user interface is associated with the vehicle

306

Provide the parameter to the vehicle based on the application being associated with the vehicl

308

End

FIG. 2

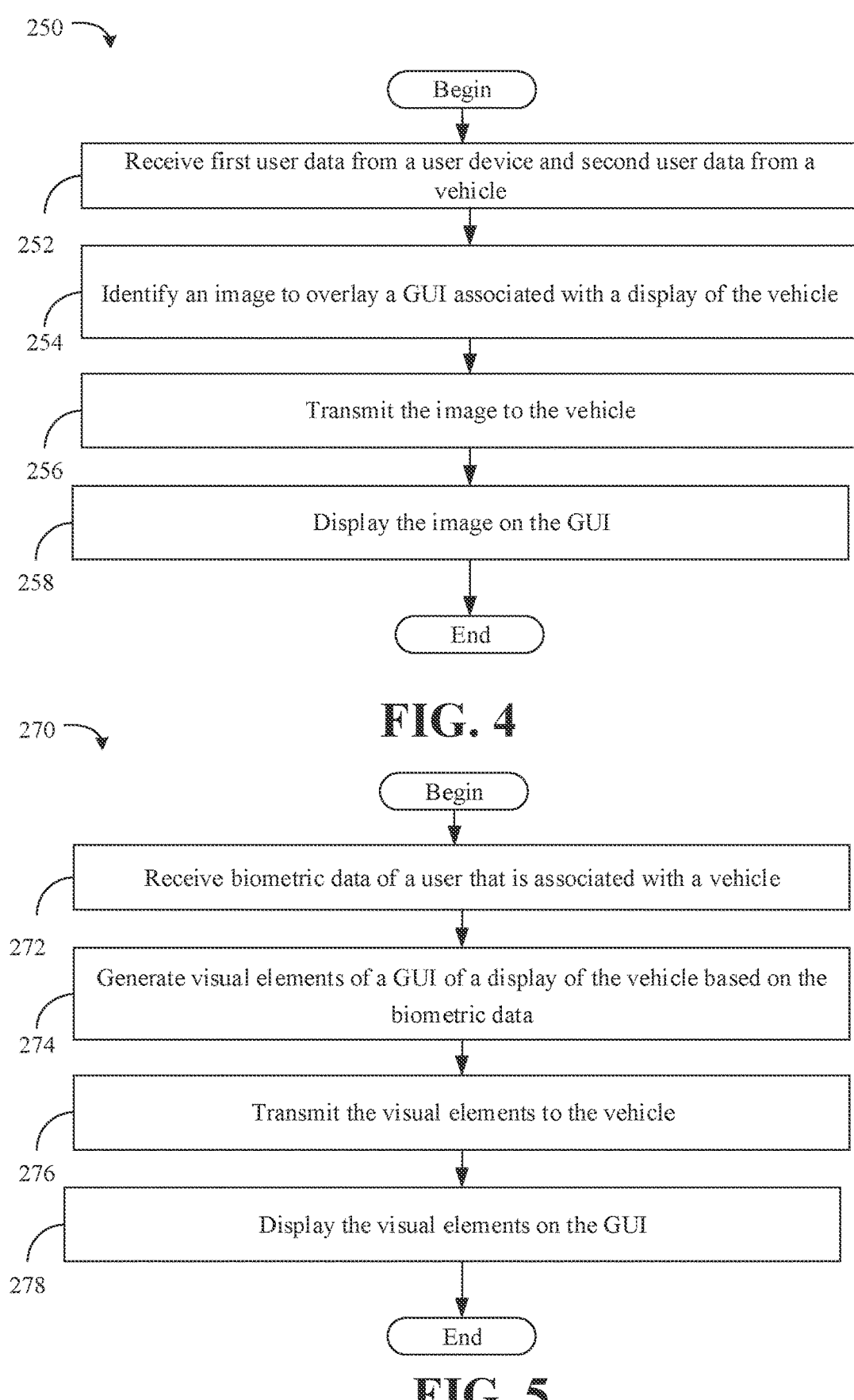

250

Begin

Receive first user data from a user device and second user data from a vehicle

252

Identify an image to overlay a GUI associated with a display of the vehicle

254

Transmit the image to the vehicle

256

Display the image on the GUI

258

End

Begin

Receive biometric data of a user that is associated with a vehicle

272

Generate visual elements of a GUI of a display of the vehicle based on the biometric data

274

Transmit the visual elements to the vehicle

276

Display the visual elements on the GUI

278

End

FIG. 5

GENERATIVE ARTIFICIAL INTELLIGENCE AND COHESIVE EXPERIENCE FOR AUTOMOTIVE APPLICATIONS

TECHNICAL FIELD

Embodiments generally relate to a cohesive user interface experience across platforms. In detail, examples unify user preferences across platforms and personalize a graphical user interface (GUI) based on factors specific to a user.

BACKGROUND

Infotainment systems may include a touch-enabled screen that allows drivers and passengers (e.g., users) to access various functionalities, such as navigation, media playback, and communication. The infotainment system may present a user interface (UI) that a user may view. The UI may be a visual portion of an infotainment system (e.g., GUI) which users interact with. The infotainment system may also include a control portion that controls an input for the user interface through touch screen, knobs, steering wheel controls, voice commands etc. The infotainment system may include various functionalities such as Global Positioning System (GPS) navigation, media playback, hands-free calls, and internet services.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some aspects, the examples described herein relate to a computing system including at least one processor, and at least one memory having a set of instructions, which when executed by the at least one processor, causes the computing system to receive first user data from an application, identify that the application is associated with a vehicle, generate, with a machine learning model, a parameter based on the first user data, where the parameter is associated with a display characteristic that controls a manner that information is presented on a user interface, where the user interface is associated with the vehicle, and provide the parameter to the vehicle based on the application being associated with the vehicle.

In some aspects, the examples described herein relate to a vehicle including a display that presents a user interface, at least one processor, and at least one memory having a set of instructions, which when executed by the at least one processor, causes the vehicle to receive a parameter from a computing device, where the parameter is generated with a machine learning model and based on first user data of an application, identify a display characteristic based on the parameter, and control a manner that information is presented on the user interface based on the display characteristic.

In some aspects, the techniques described herein relate to a method including receiving first user data from an application, identifying that the application is associated with a vehicle, generating, with a machine learning model, a parameter based on the first user data, where the parameter is associated with a display characteristic that controls a manner that information is presented on a user interface, where the user interface is associated with the vehicle, and providing the parameter to the vehicle based on the application being associated with the vehicle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 is a flowchart of a method of unifying user experiences and building enhanced GUIs according to an example;

FIG. 4 is a flowchart of a method of generating an enhanced GUI according to an example;

FIG. 5 is a flowchart of a method of generating visual elements based on biometric data according to an example;

DETAILED DESCRIPTION

Existing examples fail to provide a unified visual experience across a visual display of a vehicle (e.g., the infotainment screen) and applications (e.g., mobile applications). Currently, such platforms (e.g., infotainment screens and applications) often have different interfaces, different backgrounds, and different font styles. Existing examples lead to a disjointed user experience across electronic devices, duplicative acts to recreate settings and preferences across the different electronic devices and poor user experiences. Moreover, customization options are reduced in some environments (e.g., in a vehicle), therefore causing users to have difficulty from personalizing in-car digital environments.

Examples addresses the above technical challenges by introducing generative artificial intelligence (AI) features and synchronization capabilities that facilitate a unified experience for both the automotive displays (e.g., infotainment screen) and the associated mobile application. Further, the generative AI model may generate new preferences that the user does not previously set. That is, the generative AI model may be able to leverage powerful predictive and creative capabilities to create unique, personalized preferences and settings in real time that are generated based on a whole host of factors. Indeed, doing so may enhance user experience, enhance safety and enable the synchronization and/or passage of data between electronic devices in an efficient and unique manner. In order to execute the aforementioned enhanced processes, examples may receive a parameter from a computing device, where the parameter is generated with a machine learning model (e.g., generative AI model) and based on first user data of an application, identify a display characteristic based on the parameter, and control a manner that information is presented on the user interface based on the display characteristic.

Figure 1:
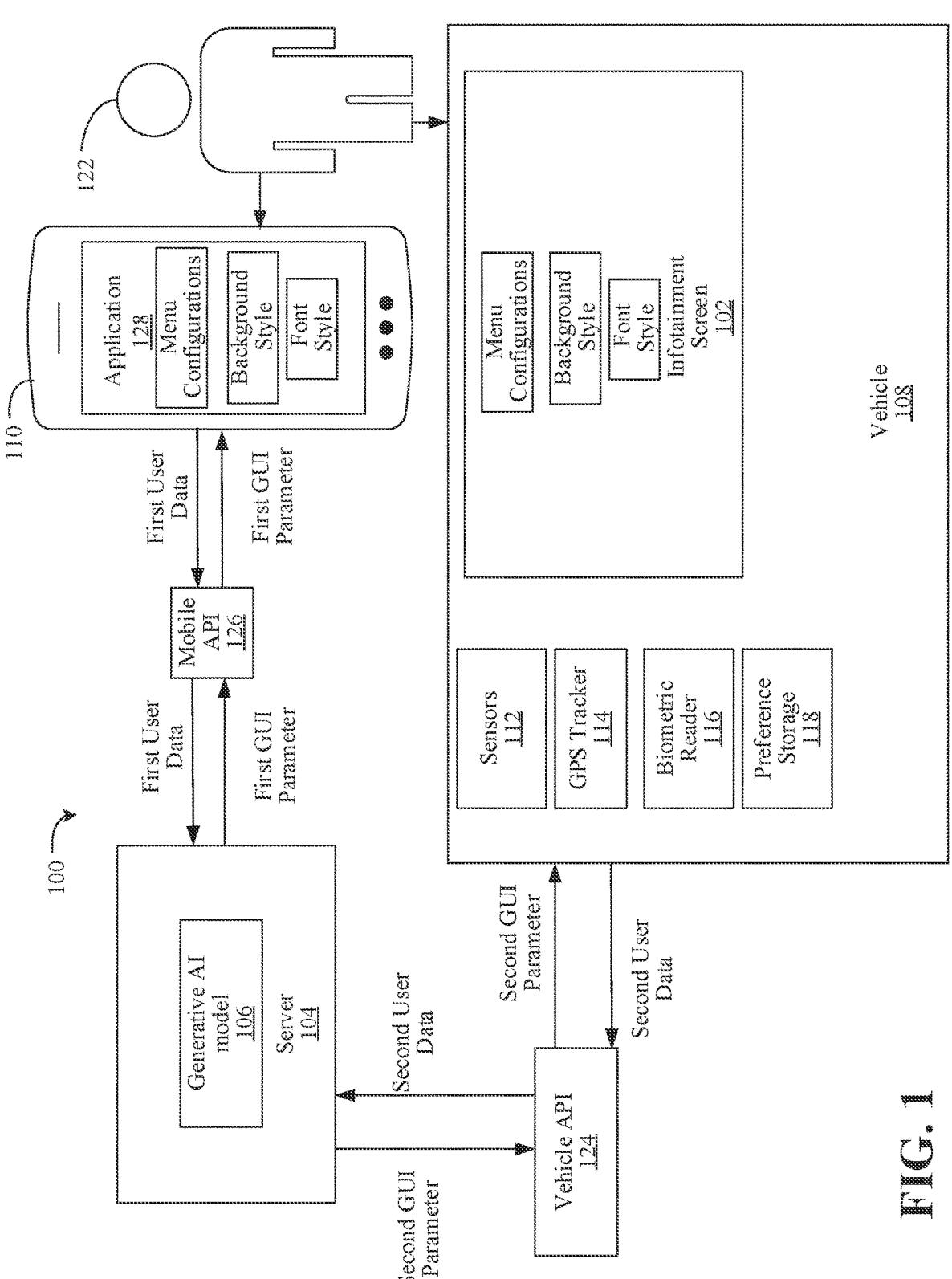
FIG. 1 illustrates a diagram of an enhanced configuration and preference generation process in accordance with an example.

Tuning now to FIG. 1, an enhanced configuration and preference generation process 100 is illustrated. In this example, a computing device 110 (e.g., a mobile device, laptop, personal digital assistant, etc.) is executing an application 128 (e.g., a mobile application). The application 128 may be associated with a vehicle 108. For example, the application 128 may be able to control the vehicle 108, provide data associated with the vehicle 108, have a common maker as the vehicle 108, etc. In some examples, the application 128 may not be associated with vehicle 108, and a user 122 may opt to provide application data of the application 128 to a server 104 to create a unified experience. In some examples, the user 122 authorizes information exchange between the vehicle 108 and the application 128.

In this example, first user data is provided from the computing device 110 to the server 104. The first user data may include difference preferences, settings, configurations, etc. of the application 128. In this example, the configuration includes a font style of the application 128, a background style of the of the application 128, and/or a menu configuration of the application 128. The first user data is provided to a mobile application programming interface (API) 126. The mobile API 126 may be a service that operates as an interface between the computing device 110 and the server 104 to allow communication, execute functions, etc. The mobile API 126 may change the first user data to be in a format compatible with the server 104.

The vehicle 108 may provide second data to the server 104. The second data may be data associated with the vehicle 108. For example, vehicle 108 may include an array of sensors that provide specific information related to the vehicle 108. For example, sensors 112 may measure conditions of the vehicle 108, including environmental conditions (e.g., temperature, humidity, ambient light readings, etc.), driving conditions (e.g., speed, changes in altitude, road conditions such as if the road is curvy, straight, bumpy, etc.) of the vehicle 108, and other sensory data associated with the vehicle 108. Sensor data of the sensors 112 may be part of the second user data. In some examples the sensors 112 may measure external environmental conditions that are external to the vehicle 108, as well as internal environmental conditions that are internal to the vehicle 108.

A global positioning system (GPS) tracker 114 provides a location of vehicle 108. The GPS tracker 114 may provide an exact location of the vehicle 108, a current time of the vehicle 108 and a velocity of the vehicle 108. GPS data of the GPS tracker 114 may be part of the second user data.

A biometric reader 116 may provider user 122 specific details. For example, the biometric reader 116 may include a smart watch that identifies a heart rate of the user 122, a breathing rate of the user 122, a blood pressure of the user 122, sleep time of the user 122 within a predefined time period prior to a current time, location of the user 122, a skin temperature of the user 122 and other biological signals of the user 122. The biometric reader 116 may further include an imaging device that images the user, including facial expressions of the user 122. In some examples, the imaging device may image the user 122, and any other occupants of the vehicle 108. Biometric data of the biometric reader 116 may form part of the second user data.

A preference storage 118 may store preferences of the user 122. For example, the preference storage 118 may store preferred fonts, backgrounds, GUI colors, sound settings, radio stations, musical lists, etc. that the user 122 has set and/or selected. As one example, the vehicle 108 may include an infotainment screen 102 that presents a vehicle GUI. The user 122 may be an occupant and/or driver of the vehicle 108, and may adjust settings of the vehicle GUI on the infotainment screen 102. The adjusted settings may be saved in the of the preference storage 118. Data from the preference storage 118 may form part of the second user data.

A vehicle API 124 may receive the second user data from the vehicle 108. The vehicle API 124 may be a service that operates as an interface between the vehicle 108 and the server 104 to allow communication, execute functions, etc. The vehicle API 124 may change the second user data to be in a format compatible with the server 104.

The server 104 therefore may receive the first and second user data. The server 104 may execute a machine learning model to generate features for the application 128 on the computing device 110, and as well as for the vehicle GUI of the vehicle 108. In this example, the machine learning model is a generative artificial intelligence (AI) generative AI model 106. It will be understood that other machine learning models may be used instead of and/or in conjunction with the generative AI model 106.

For example, existing implementations may operate only with predefined formats, fonts, layouts, configurations etc. Such existing implementations lack the ability to customize and personalize applications and GUIs to a specific user. That is, users are bound to select predefined options without customization and/or personalization. Examples may address the above constraints of existing implementations by enabling unique, personal and innovative designs to be generated with the generative AI model 106. The generative AI model 106 may receive the first and second data, and generate unique fonts, colors, layouts, configurations and backgrounds for an application GUI of the application 128 and the vehicle GUI based on the first and second data. For example, the generative AI model 106 may generate AI backgrounds and fonts. In detail, the generative AI model 106 includes augmented generative AI algorithms that dynamically generate visually appealing backgrounds and font styles for the infotainment screen 102 and the application 128. By leveraging machine learning techniques, the generative AI model 106 adapts to user preferences in real-time to provide a personalized and cohesive visual experience.

For example, suppose that the second user data includes light sensor data measured by the vehicle 108. The light sensor data may include an indication that the intensity of light external and/or internal to the vehicle 108 corresponds to daylight (e.g., light intensity is around 10,000 Lux). As such, the fonts of the mobile application and the vehicle GUI of the infotainment screen 102 may be adjusted to a brighter font color, and with a bright background. Further, suppose that at a time thereafter, the light intensity is detected as slowly dropping (e.g., during dusk). Examples may slowly adjust the brightness of the background and the font color to slowly decrease in brightness based on the intensity of the light. As such, examples may avoid a discrete and sudden change in the font color and the brightness of the background, to create an easier to view experience for the user, as opposed to existing examples which create a sudden color and brightness shift on GUIs when shifting between night settings and day settings.

Furthermore, examples may adjust the application 128 and/or vehicle GUI based on a location of the vehicle 108. Suppose that positional data from the GPS tracker 114 (e.g., included as part of the second user data) indicates that the vehicle 108 is in a particular area. Examples may adjust the background to reflect the area. For example, the background may be adjusted to an icon associated with an urban setting if the vehicle 108 is detected as being in the urban setting. As a detailed example, if the vehicle 108 is in London, the background may be Big Ben. As another example, if the vehicle 108 is in Tokyo, the background may be Mount Fuji, etc. As another example, suppose that the vehicle 108 is detected as being in a particular rural environment, the background may be adjusted to an image that represents the rural environment. For example, suppose that the vehicle 108 is in a desert, the background may be adjusted to an image of a cactus in a desert. Further, suppose that the vehicle 108 is near a lake, the background may be adjusted to an image of a lake with trees surrounding the lake. Thus, the background may be adjusted to an image that represents the surroundings (e.g., position) of the vehicle 108 in real-time.

Further, the application 128 and/or vehicle GUI may be adjusted based on a driving condition associated with vehicle 108. For example, suppose that sensor data (e.g., images taken by an imaging device include numerous vehicles, positional data correlated to a heavy traffic in a live map, etc.) of the second user data indicates that the vehicle 108 is in heavy traffic. Examples may present soothing backgrounds to the user 122 and adjust to calming fonts to calm the user 122. For example, heavy traffic may frustrate most drivers in the heavy traffic. Thus, examples may pre-emptively provide calming backgrounds, fonts, etc. to reduce a potential aggravation of the user 122.

Similarly, biometric data may indicate that the user 122 is experiencing biological signs associated with an agitated and/or angry emotional state. In such a case, the soothing background and calming fonts may be presented to the user 122. In some examples, audio of the vehicle 108 and/or application 128 may also be controlled to soothe and/or calm the user 122. Furthermore, if the first and/or second user data indicates that the user 122 is in a jovial mood, the background and/or fonts may be adjusted to cheerful colors and/or fonts to complement a mood of the user 122. That is, examples may predict an emotional state of the user 122 (e.g., annoyed, irritated, angry, happy, etc.) based on the first and/or second user data, adjust the application 128 and/or vehicle GUI based on the predicted emotional state and continue to monitor the emotional state of the user 122 based on the first and/or second user data and adjust elements of the application 128 and/or vehicle GUI accordingly.

Furthermore, suppose that the second user data (e.g., images, temperature, etc.) indicates that the vehicle 108 is travelling through a cold area and/or snow. Examples may adjust the background and/or font to reflect colder temperatures (e.g., blue font with a snow background). Suppose also that the second user data (e.g., images, temperature, etc.) indicates that the vehicle 108 is travelling through a warm area. Examples may adjust the background, color and/or font to reflect hotter temperatures (e.g., red colored font with a tropical background). As such, examples may adjust elements of the application 128 and/or vehicle GUI to reflect weather and/or climate conditions of the vehicle 108. In some examples the application 128 and vehicle GUI may be adjusted based on seasons and similarly to as described above (e.g., blue color, winter fonts and snowperson selected as background during winter).

In some examples, the application 128 and/or vehicle GUI may be adjusted based on a driving condition of the vehicle 108. For example, the driving condition may indicate that the vehicle 108 is travelling along a bumpy roadway. In such an example, the font size may be increased to enable the user

122 to scan and read elements (e.g., words in the font size) even when a field of view of the user 122 rapidly changes due to the bumpy motion of the vehicle 108. In another example, if the driving condition indicates that the vehicle 108 is travelling and/or will travel on a curvy road, the background may be adjusted to an image of a curved road to notify the user 122 of the curvature of the road. Similarly, the background may be adjusted to an image of a straight road if a straight road is predicted to be traversed, etc. The driving conditions may be detected based on sensor data of the sensors 112 (e.g., based on imaging data of the road, accelerometers that detect significant upward and downward movement, etc.), positional data from the GPS tracker 114, map data that is associated with the positional data, navigation data, of the vehicle 108, etc.

Moreover, examples may adjust the application 128 and/or vehicle GUI based on a speed of the vehicle 108. For example, if second user data indicates that the velocity of the vehicle 108 is above a threshold, a corresponding background (e.g., race car background, rocket ship, etc.) that symbolizes a high speed may be selected, and similarly a font (e.g., ITC Odyssé Italic, Faster One, etc.), color and lettering that symbolize the high speed may be selected for words that are displayed on the application 128 and/or vehicle GUI. If the velocity is below the threshold, a corresponding background (e.g., turtle, snail, etc.) that symbolizes a low speed may be selected, and similarly a font, color and lettering that symbolize the low speed may be selected for words that are displayed on the application 128 and/or vehicle GUI.

Further, some examples may adjust the application 128 and/or vehicle GUI based on a physical characteristic of the vehicle 108. For example, if the vehicle 108 is a particular color, the application 128 and/or vehicle GUI may be adjusted to match the color of the vehicle 108.

Moreover, some examples may adjust the vehicle 108 based on a time associated with the vehicle. For example, if the time associated with vehicle 108 is in the morning, a rising sun may be set to the background, with letters being in a morning font in yellow. Further, if the time is an evening, a setting sun may be set to the background with the letters being adjusted to an evening font in red. Examples may further dynamically adjust the background, colors and fonts in real-time (e.g., slowly adjust the red color of letters to a blue color as evening changes to night) based on the time (e.g., as the time transitions from evening hours to night hours).

Existing computing architectures fail to address cohesion among different applications and systems. Examples herein remedy existing computing architectures by synchronizing between the infotainment screen 102 and the application 128. Examples establish a seamless synchronization mechanism between an infotainment unit that controls the infotainment screen 102 and the application 128. Doing so enables the user 122 to transfer customized backgrounds, font styles, and other visual elements between the two platforms effortlessly. Any changes made on one platform, such as the application 128, will be automatically reflected on the other platform (e.g., the vehicle GUI), creating a consistent and synchronized user experience. For example, menu configurations, background style and font style selected on the application 128 may be part of the first user data. The first user data is then transferred to the generative AI model 106. When the generative AI model 106 generates adjustments to the application 128 and/or the vehicle GUI, the generative AI model 106 may do so while still complying with the menu configurations, background style and font style selected by user 122. For example, if user 122 prefers a certain font, the generative AI model 106 may execute adjustments (e.g., color, size, etc.) that do not affect the font. In some examples, new fonts may be generated based on the certain font, and to avoid deviating significantly from the certain font (e.g., adjusted components of adjusted fonts such as arm/leg, ascender, bar, bowl etc. are within a predefined deviation of certain components of the certain font). Thus, new fonts based on the adjusted font may be generated. In some examples, the menu configurations, the background style and the font style are automatically transferred to the infotainment screen 102 for storage and to present data.

The menu configurations may include an organization of information, commands, etc. of the application 128 and/or vehicle GUI (e.g., home, points-of-interest, navigate, entertainment, vehicle statistics, wipers, interior light actuation, etc.). Menus may be organized in such a way that the related commands are grouped together. In some examples, user 122 may modify the organization (e.g., place a particular action at a home screen). The menu configurations may reflect such organizational changes.

In some examples, the generative AI model 106 enables an enhanced and seamless user customization. For example, the unified experience extends to the customization options available to users. The user 122 may select from a wide range of pre-generated backgrounds and font styles and generate unique and personalized font styles and backgrounds using intuitive tools provided in the application 128, in some examples based on the pre-generated backgrounds and font styles. Such customizations may be applied across both the infotainment screen 102 and the associated application 128, further enhancing the personalization possibilities. Thus, the generative AI model 106 may receive the selected backgrounds, selected font styles, generated font styles and generated backgrounds to generate new fonts and backgrounds for the user 122 based on the first and second user data.

Thus, the generative AI model 106 may include intelligent context-aware features. For example, the generative AI model 106 leverages intelligent context-awareness capabilities to adapt the visual presentation of information on the infotainment screen 102 and the computing device 110 based on data specific to the vehicle 108 (e.g., the driving conditions) and user preferences. For example, during nighttime driving, the system may generate darker backgrounds and adjust font colors to reduce visual strain and enhance readability.

In some examples, the intelligent context-awareness capabilities may also extend to identification of other occupants in the vehicle 108. For example, image data of the second user data may indicate that several occupants are in vehicle 108. Image recognition may be executed to identify the occupants, and menu configurations, background styles, font styles etc. associated with the occupants. The generative AI model 106 may generate updates to the fonts, backgrounds, colors, menu configurations, etc. based on the associated menu configurations, background styles, font styles etc. of the occupants as well as a driver.

The generative AI model 106 may generate a first GUI parameter and a second GUI parameter. The first GUI parameter and the second GUI parameter may be parameters associated with a display characteristic that controls a manner that information is presented on a user interface such as the infotainment screen 102 and/or the application 128. The first GUI parameter and second GUI parameter may be provided to the computing device 110 and the vehicle 108 via the mobile API 126 and the vehicle API 124 respectively. The infotainment screen 102 may control the vehicle GUI based on the second GUI parameter. The computing device 110 may control a GUI of the application 128 based on the first GUI parameter. The second GUI parameter may be provided to the vehicle 108 based on the vehicle 108 being associated with the application 128.

Thus, enhanced configuration and preference generation process 100 results in several technical enhancements particular to a computing environment. The enhanced configuration and preference generation process 100 results in a unified experience that unifies the visuals between the infotainment screen 102 and the application 128 of the computing device 110. Enhanced configuration and preference generation process 100 creates a seamless and consistent user experience, reducing cognitive load and increasing usability. Furthermore, the generative AI model 106 may customize an in-car digital environment to suit preferences of the user 122, fostering a sense of ownership and enhancing user satisfaction. Furthermore, enhanced configuration and preference generation process 100 results in dynamic adaptation that may execute in real-time.

The generative AI features and context-awareness capabilities of the generative AI model 106 ensure that the visual elements adapt intelligently to various driving conditions, enhancing safety and comfort. Moreover, enhanced configuration and preference generation process 100 may operate as a synchronization mechanism to simplify the process of transferring customized backgrounds, font styles, and other visual elements between the infotainment screen 102 and the application 128 of the computing device 110, reducing user effort.

As such, enhanced configuration and preference generation process 100 presents a unified experience for automotive infotainment systems with the associated applications, and is powered by generative AI features and advanced synchronization capabilities. The enhanced configuration and preference generation process 100 represents an enhanced process that addresses the challenges faced in the automotive and computing industries (e.g., existing examples fail to unify and transfer customized settings between platforms, fail to personalize GUIs and have a limited selection of fonts and backgrounds). Examples may provide a visually cohesive, customizable, and context-aware interface, ultimately enhancing the overall user experience and setting new standards for the infotainment systems.

FIG. 2 shows a method 300 of unifying user experiences and building enhanced GUIs based on user preferences. The method 300 may generally be implemented in the enhanced configuration and preference generation process 100 (FIG. 1). In an embodiment, the method 300 is implemented in logic instructions (e.g., software), a non-transitory computer readable storage medium, circuitry, configurable logic, fixed-functionality hardware logic, etc., or any combination thereof.

Illustrated processing block 302 receives first user data from an application. Illustrated processing block 304 identifies that the application is associated with a vehicle. Illustrated processing block 306 generates, with a machine learning model, a parameter based on the first user data, where the parameter is associated with a display characteristic that controls a manner that information is presented on a user interface, where the user interface is associated with the vehicle. Illustrated processing block 308 provides the parameter to the vehicle based on the application being associated with the vehicle.

In some examples, the method 300 further includes receiving second user data associated with one or more of the vehicle or a user, and the generating includes generating, with the machine learning model, the parameter based on the second user data. In such examples, the second user data is one or more of a location of the vehicle, weather associated with the vehicle, a speed of the vehicle, a physical characteristic of the vehicle, a time associated with the vehicle, an illumination associated with the vehicle, a temperature associated with the vehicle, a driving condition of the vehicle, a season associated with the vehicle, or biometric data associated with the user.

In some examples method 300 includes receiving third user data that is a characteristic (e.g., biometric data, user preference data, etc.) of an occupant of the vehicle, and the generating includes generating the parameter based on the third user data. In some examples, the method 300 further includes identifying mobile display preferences from the first user data, and setting the display characteristic to synchronize the mobile display preferences with vehicle display preferences of the user interface. In some examples of the method 300, the machine learning model is a generative artificial intelligence model, and the display characteristic includes one or more of a font style of the user interface, a background style of the user interface, or a menu of the user interface.

Figure 3:
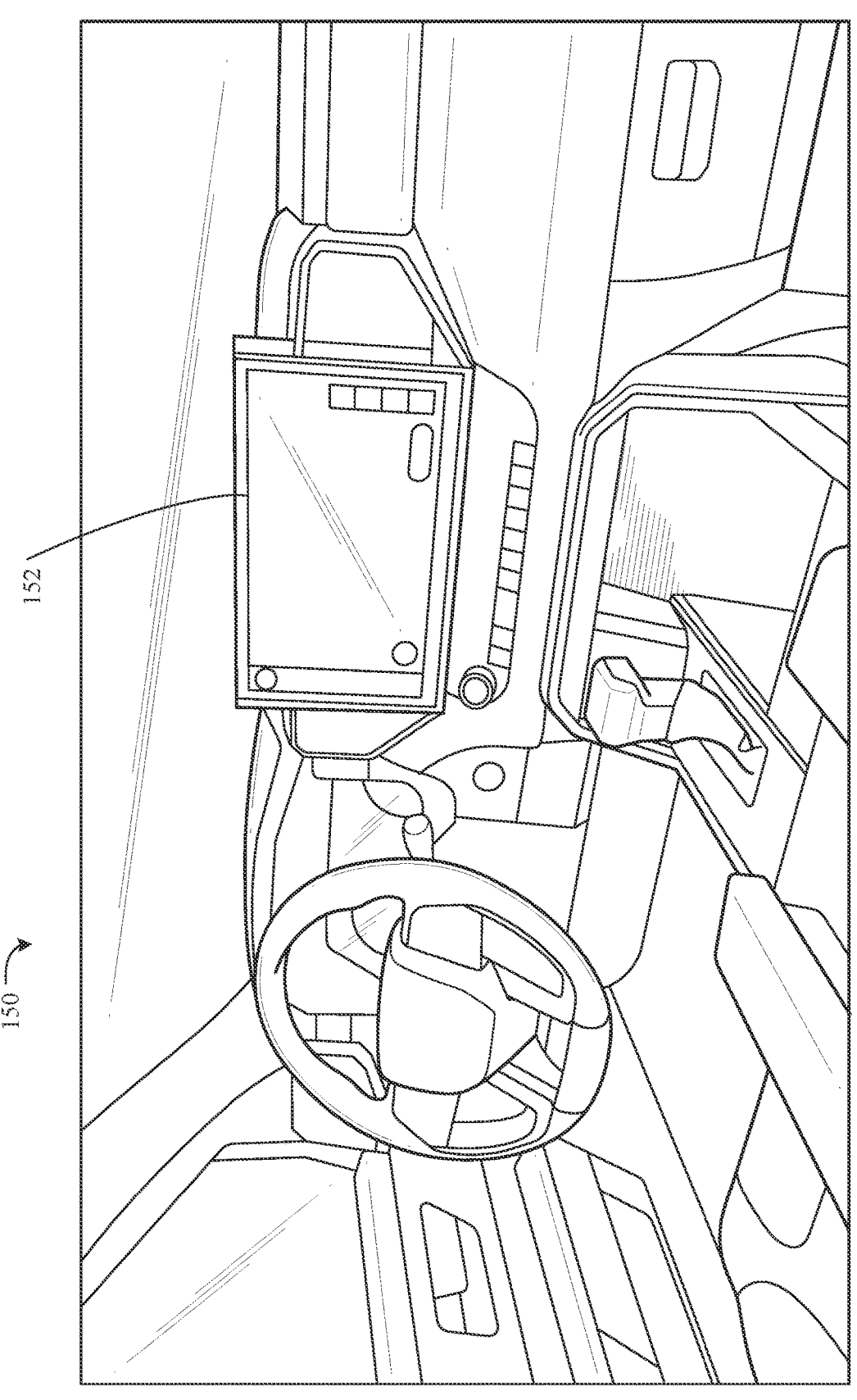
FIG. 3 illustrates a diagram of a vehicle in accordance with an example.

FIG. 3 shows a vehicle 150. The vehicle 150 may generally be implemented in conjunction with the enhanced configuration and preference generation process 100 (FIG. 1) and/or method 300 (FIG. 2). In an example, the vehicle 150 includes an infotainment display 152. The infotainment display 152 may be connected with an infotainment controller that is implemented in logic instructions (e.g., software), a non-transitory computer readable storage medium, circuitry, configurable logic, fixed-functionality hardware logic, etc., or any combination thereof. The infotainment controller may control display parameters of infotainment display 152 and based on parameters received from a server as described above.

FIG. 4 shows a method 250 of generating an enhanced GUI. The method 250 may generally be implemented in the enhanced configuration and preference generation process 100 (FIG. 1), method 300 (FIG. 2), and/or vehicle 150 (FIG. 3). In an embodiment, the method 250 is implemented in logic instructions (e.g., software), a non-transitory computer readable storage medium, circuitry, configurable logic, fixed-functionality hardware logic, etc., or any combination thereof.

Illustrated processing block 252 receives first user data from a user device (e.g., a mobile device) and second user data from a vehicle. The user device and the vehicle may be associated with the each other (e.g., a same user of the application also drives the vehicle). Illustrated processing block 254 identifies an image to overlay a GUI. Illustrated processing block 256 transmits the image to the vehicle. Illustrated processing block 258 displays the image on the GUI. For example, the image may partially cover menu options, text, etc. presented on the GUI. The image may be partially transparent to allow a user to identify underlying text and/or options presented on the GUI. If the text or the options are selected by a user, the image may become a background so that the text and/or options are shown over the image and are fully visible.

FIG. 5 shows a method 270 of generating visual elements based on biometric data. The method 270 may generally be implemented in the enhanced configuration and preference generation process 100 (FIG. 1), method 300 (FIG. 2), vehicle 150 (FIG. 3) and/or method 250 (FIG. 4). In an embodiment, the method 270 is implemented in logic instructions (e.g., software), a non-transitory computer readable storage medium, circuitry, configurable logic, fixed-functionality hardware logic, etc., or any combination thereof.

Illustrated processing block 272 receives biometric data of a user that is associated with a vehicle (e.g., the user may be driving the vehicle). Illustrated processing block 274 generates visual elements of a GUI of a display of the vehicle based on the biometric data. For example, if the biometric data (e.g., heartbeat, blood pressure, images of eyes closing, etc.) indicates that the user is nearing a resting state (e.g., sleepy), images and fonts to arouse the user may be presented as the visual elements (e.g., animations of waking up, cups of coffee, etc.) and/or generate warning signs to instruct the user to be more attentive. Illustrated processing block 276 transmits the visual elements to the vehicle. Illustrated processing block 278 displays the visual elements on the GUI.

Figures 6, 7:
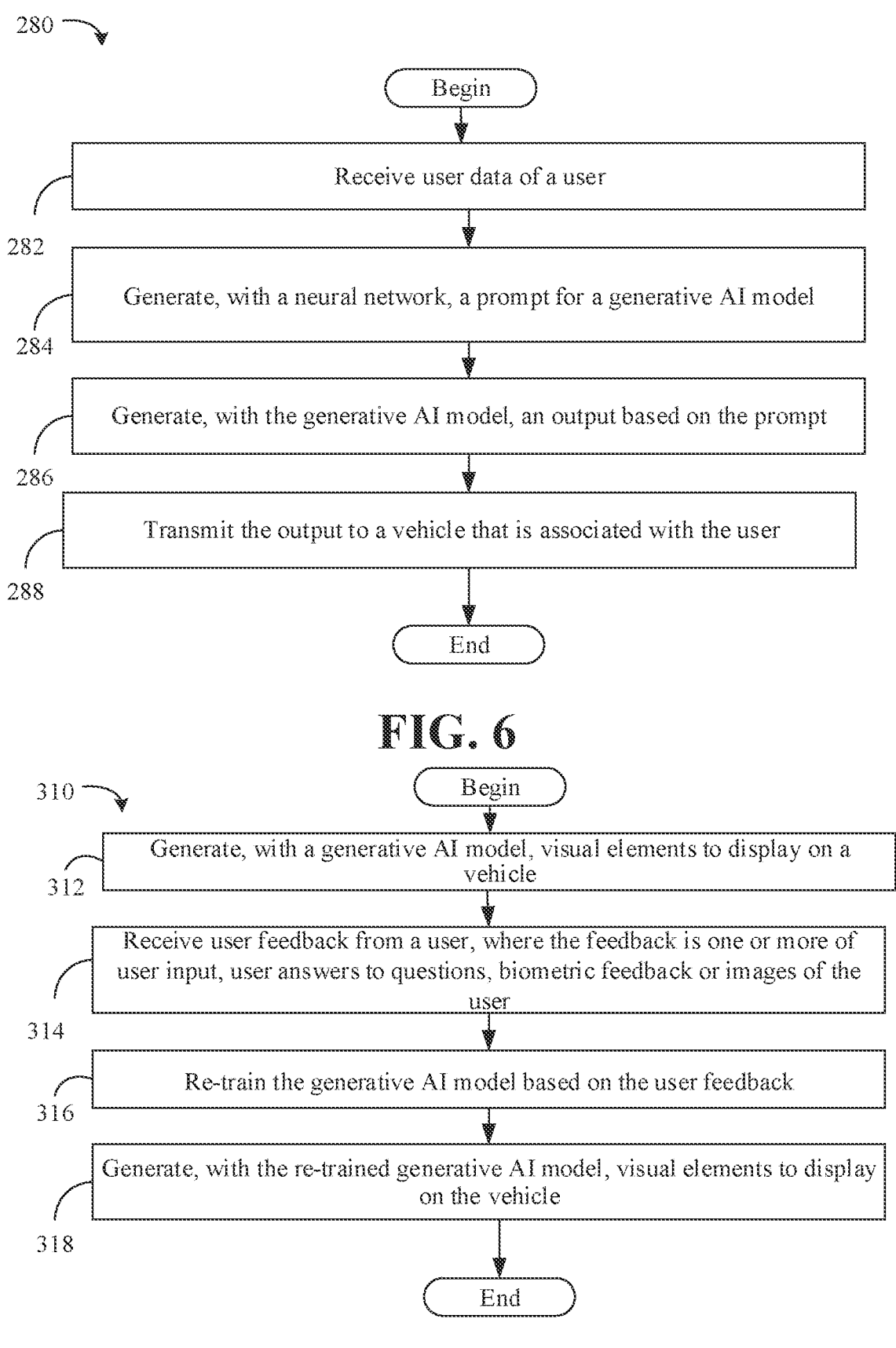
FIG. 6 is a flowchart of a method of generating prompts for a generative AI model according to an example.
FIG. 7 is a flowchart of a method of providing user feedback to a generative AI model according to an example.

FIG. 6 shows a method 280 of generating prompts for a generative AI model. The method 280 may generally be implemented in the enhanced configuration and preference generation process 100 (FIG. 1), method 300 (FIG. 2), vehicle 150 (FIG. 3), method 250 (FIG. 4) and/or method 270 (FIG. 5). In an embodiment, the method 280 is implemented in logic instructions (e.g., software), a non-transitory computer readable storage medium, circuitry, configurable logic, fixed-functionality hardware logic, etc., or any combination thereof.

Illustrated processing block 282 receives user data of a user (e.g., from a mobile application and/or a vehicle). Illustrated processing block 284 generates, with a neural network, a prompt for a generative AI model, such as the generative AI model 106 (FIG. 1). That is, since the generative AI model may expect an input as a specific type of prompt (e.g., textual), the neural network may be trained to receive data in different formats (e.g., sensory data, biometric data, GPS data of a vehicle, image data, and any other data that is described as being the first user data and/or the second user data), and generate an input to the generative AI model in an expected format (e.g., as a textual prompt). Thus, the neural network may receive data in a first data formats (e.g., heterogenous data formats), and generate a prompt for the generative AI model in a second data format compatible with the generative AI model. Illustrated processing block 286 generates, with the generative AI model, an output based on the prompt. Illustrated processing block 288 transmits the output to a vehicle that is associated with the user. The output may be used to generate a GUI presented on a display of the vehicle.

FIG. 7 shows a method 310 of providing user feedback to a generative AI model. The method 310 may generally be implemented in the enhanced configuration and preference generation process 100 (FIG. 1), method 300 (FIG. 2), vehicle 150 (FIG. 3), method 250 (FIG. 4), method 270 (FIG. 5) and/or method 280 (FIG. 6). In an embodiment, the method 310 is implemented in logic instructions (e.g., software), a non-transitory computer readable storage medium, circuitry, configurable logic, fixed-functionality hardware logic, etc., or any combination thereof.

Illustrated processing block 312 generates, with a generative AI model, visual elements (e.g., background, fonts, text, color of text, etc.) to display on a vehicle (e.g., on a display of the vehicle). Illustrated processing block 314 receives user feedback from a user, where the feedback is one or more of user input, user answers to questions, biometric feedback or images of the user. For example, the user may provide explicit feedback regarding the visual elements. In some examples, questions may be presented to the user to inquire whether the user finds the visual elements to be satisfactory or unsatisfactory. The user may answer the questions and the user answers recorded. In some examples, the user's emotions may be determined based biometric feedback. For example, if the user is pleased with the visual elements, the heartbeat of the user, blood pressure of the user, etc. may be within a first set of ranges. If the user is annoyed, irritated, angry, etc. with the visual features, the heartbeat of the user, blood pressure of the user, etc. may be within a second set of ranges. Furthermore, images of the user may indicate whether the user is having difficulty (e.g., squinting, confused appearance, etc. due to difficult readability of text) with the visual elements or appears to have not difficulty with the visual elements.

Illustrated processing block 316 re-trains the generative AI model based on the user feedback to increase the useability of visual icons generated with the generative AI model (e.g., increase the satisfaction of the user, decrease negative emotions of the user such as annoyance, anger, irritation, increase readability, etc.). Illustrated processing block 318 generates, with the re-trained generative AI model, visual elements to display on the vehicle.

Figure 8:
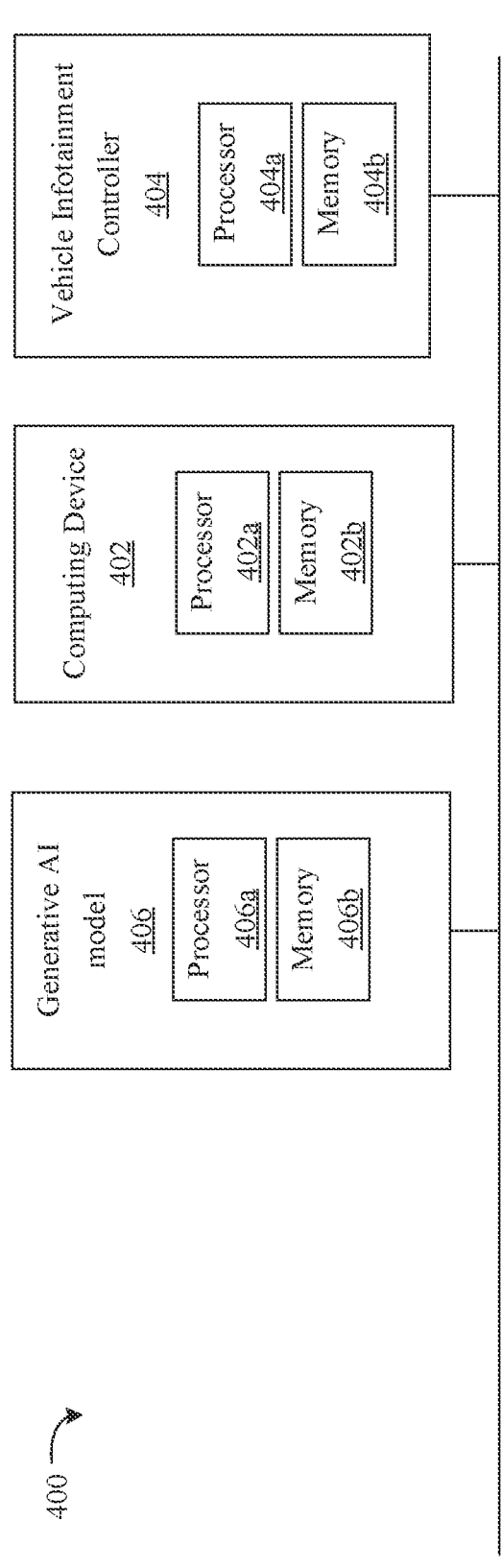
FIG. 8 is a block diagram of an example of a unified user experience system according to an embodiment.

FIG. 8 shows a more detailed example of a unified user experience system 400. The unified user experience system 400 may generally be implemented in the enhanced configuration and preference generation process 100 (FIG. 1), method 300 (FIG. 2), vehicle 150 (FIG. 3), method 250 (FIG. 4), method 270 (FIG. 5), method 280 (FIG. 6) and/or method 310 (FIG. 7).

A generative AI model 406 may include a processor 406a (e.g., embedded controller, central processing unit/CPU) and a memory 406b (e.g., non-volatile memory/NVM and/or volatile memory). The memory 406b contains a set of instructions, which when executed by the processor 406a, cause the generative AI model 406 to generate visual elements for GUIs based on data from computing device 402 and vehicle information controller 404. The visual elements may be provided to the computing device 402 and the vehicle information controller 404.

The computing device 402 may include a processor 402a (e.g., embedded controller, central processing unit/CPU) and a memory 402b (e.g., non-volatile memory/NVM and/or volatile memory). The memory 402b contains a set of instructions, which when executed by the processor 402a, cause the computing device 402 to present a GUI of an application based on the visual elements from the generative AI model 406. The computing device 402 may also provide data to the generative AI model 406. The computing device 402 may be readily incorporated into and/or substitute for the computing device 110 (FIG. 1).

The vehicle information controller 404 may include a processor 404a (e.g., embedded controller, central processing unit/CPU) and a memory 404b (e.g., non-volatile memory/NVM and/or volatile memory). The memory 404b contains a set of instructions, which when executed by the processor 404a, cause the vehicle information controller 404 to present a GUI on an infotainment system (e.g., display) of the vehicle and based on the visual elements from the generative AI model 406. The vehicle information controller 404 may also provide data to the generative AI model 406. The vehicle information controller 404 may be readily incorporated into the infotainment screen 102 (FIG. 1).

CLAUSES

Clause 1. A computing system comprising: at least one processor; and at least one memory having a set of instructions, which when executed by the at least one processor, causes the computing system to: receive first user data from an application; identify that the application is associated with a vehicle; generate, with a machine learning model, a parameter based on the first user data, wherein the parameter is associated with a display characteristic that controls a manner that information is presented on a user interface, wherein the user interface is associated with the vehicle; and provide the parameter to the vehicle based on the application being associated with the vehicle.

Clause 2. The computing system of clause 1, wherein the instructions of the at least one memory, when executed, cause the computing system to: receive second user data associated with one or more of the vehicle or a user, and wherein, to generate the parameter, the instructions of the at least one memory, when executed, cause the computing system to generate, with the machine learning model, the parameter based on the second user data.

Clause 3. The computing system of clause 2, wherein the second user data is one or more of a location of the vehicle, weather associated with the vehicle, a speed of the vehicle, a physical characteristic of the vehicle, a time associated with the vehicle, an illumination associated with the vehicle, a temperature associated with the vehicle, a driving condition of the vehicle, a season associated with the vehicle, or biometric data associated with the user.

Clause 4. The computing system of clause 1, wherein the instructions of the at least one memory, when executed, cause the computing system to: receive third user data that is a characteristic of an occupant of the vehicle; and wherein, to generate the parameter, the instructions of the at least one memory, when executed, cause the computing system to generate the parameter based on the third user data.

Clause 5. The computing system of clause 1, wherein the instructions of the at least one memory, when executed, cause the computing system to: identify mobile display preferences from the first user data; and set the display characteristic to synchronize the mobile display preferences with vehicle display preferences of the user interface.

Clause 6. The computing system of clause 1, wherein the machine learning model is a generative artificial intelligence model.

Clause 7. The computing system of clause 1, wherein the display characteristic includes one or more of a font style of the user interface, a background style of the user interface, or a menu of the user interface.

Clause 8. A vehicle comprising: a display that presents a user interface; at least one processor; and at least one memory having a set of instructions, which when executed by the at least one processor, causes the vehicle to: receive a parameter from a computing device, wherein the parameter is generated with a machine learning model and based on first user data of an application; identify a display characteristic based on the parameter; and control a manner that information is presented on the user interface based on the display characteristic.

Clause 9. The vehicle of clause 8, wherein the instructions of the at least one memory, when executed, cause the vehicle to: transmit second user data associated with one or more of the vehicle or a user to the computing device, and wherein the parameter is generated, with the machine learning model, based on the second user data.

Clause 10. The vehicle of clause 9, wherein the second user data is one or more of a location of the vehicle, weather associated with the vehicle, a speed of the vehicle, a physical characteristic of the vehicle, a time associated with the vehicle, an illumination associated with the vehicle, a temperature associated with the vehicle, a driving condition of the vehicle, a season associated with the vehicle, or biometric data associated with the user.

Clause 11. The vehicle of clause 8, wherein the instructions of the at least one memory, when executed, cause the vehicle to: provide third user data to the computing device, wherein the third user data includes a characteristic of an occupant of the vehicle; and wherein the parameter is generated based on the third user data.

Clause 12. The vehicle of clause 8, wherein the first user data includes mobile display preferences, and the display characteristic synchronizes the mobile display preferences with vehicle display preferences of the user interface.

Clause 13. The vehicle of clause 8, wherein the machine learning model is a generative artificial intelligence model.

Clause 14. The vehicle of clause 8, wherein the display characteristic includes one or more of a font style of the user interface, a background style of the user interface, or a menu of the user interface.

Clause 15. A method comprising: receiving first user data from an application; identifying that the application is associated with a vehicle; generating, with a machine learning model, a parameter based on the first user data, wherein the parameter is associated with a display characteristic that controls a manner that information is presented on a user interface, wherein the user interface is associated with the vehicle; and providing the parameter to the vehicle based on the application being associated with the vehicle.

Clause 16. The method of clause 15, further comprising: receiving second user data associated with one or more of the vehicle or a user, and wherein the generating includes generating, with the machine learning model, the parameter based on the second user data.

Clause 17. The method of clause 16, wherein the second user data is one or more of a location of the vehicle, weather associated with the vehicle, a speed of the vehicle, a physical characteristic of the vehicle, a time associated with the vehicle, an illumination associated with the vehicle, a temperature associated with the vehicle, a driving condition of the vehicle, a season associated with the vehicle, or biometric data associated with the user.

Clause 18. The method of clause 15, further comprising: receiving third user data that is a characteristic of an occupant of the vehicle; and wherein the generating includes generating the parameter based on the third user data.

Clause 19. The method of clause 15, further comprising: identifying mobile display preferences from the first user data; and setting the display characteristic to synchronize the mobile display preferences with vehicle display preferences of the user interface.

Clause 20. The method of clause 15, wherein the machine learning model is a generative artificial intelligence model, and wherein the display characteristic includes one or more of a font style of the user interface, a background style of the user interface, or a menu of the user interface.

The above described methods and systems may be readily combined together if desired. The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

What is claimed is:

1. A computing system comprising:
at least one processor; and
at least one memory having a set of instructions, which when executed by the at least one processor, causes the computing system to:
receive first user data from an application of a mobile device;
identify that the application is associated with a vehicle;
identify mobile display preferences of the application from the first user data, wherein the mobile display preferences include a background style of the mobile device including a mobile background selected by a user;
identify second user data that indicates a location of the vehicle;
generate, with a machine learning model, a parameter based on the first user data and the second user data by generating a new vehicle background for a vehicle graphical user interface of the vehicle based on the background style, the mobile background and the location, wherein the parameter is associated with a display characteristic that controls a presentation of the new vehicle background on the vehicle graphical user interface, wherein the new vehicle background is different from the mobile background; and
provide the parameter to the vehicle based on the application being associated with the vehicle.

2. The computing system of claim 1, wherein the second user data further includes one or more of weather associated with the vehicle, a speed of the vehicle, a physical characteristic of the vehicle, a time associated with the vehicle, an illumination associated with the vehicle, a temperature associated with the vehicle, a driving condition of the vehicle, a season associated with the vehicle, or biometric data associated with a user.

3. The computing system of claim 1, wherein the instructions of the at least one memory, when executed, cause the computing system to:
receive third user data that is a characteristic of an occupant of the vehicle; and
wherein, to generate the parameter, the instructions of the at least one memory, when executed, cause the computing system to generate the parameter based on the third user data.

4. The computing system of claim 1, wherein the instructions of the at least one memory, when executed, cause the computing system to:

set the display characteristic to synchronize the mobile display preferences with vehicle display preferences of the vehicle graphical user interface.

5. The computing system of claim 1, wherein the machine learning model is a generative artificial intelligence model.

6. The computing system of claim 1, wherein the display characteristic further includes one or more of a font style of the vehicle graphical user interface, or a menu of the vehicle graphical user interface.

7. A vehicle comprising:

a display that presents a vehicle graphical user interface;

at least one processor; and at least one memory having a set of instructions, which when executed by the at least one processor, causes the vehicle to:

receive a parameter from a computing device, wherein the parameter is generated with a machine learning model and based on mobile display preferences of first user data of an application and second user data that indicates a location of the vehicle, wherein the mobile display preferences include a background style of a mobile device including a mobile background selected by a user, wherein the machine learning model generates a new vehicle background for the vehicle graphical user interface based on the background style, the mobile background and the location, wherein the new vehicle background is different from the mobile background;

identify a display characteristic based on the parameter; and control the vehicle graphical user interface based on the display characteristic by displaying the new vehicle background on the vehicle graphical user interface.

8. The vehicle of claim 7, wherein the second user data is one or more of weather associated with the vehicle, a speed of the vehicle, a physical characteristic of the vehicle, a time associated with the vehicle, an illumination associated with the vehicle, a temperature associated with the vehicle, a driving condition of the vehicle, a season associated with the vehicle, or biometric data associated with a user.

9. The vehicle of claim 7, wherein the instructions of the at least one memory, when executed, cause the vehicle to:

provide third user data to the computing device, wherein the third user data includes a characteristic of an occupant of the vehicle; and wherein the parameter is generated based on the third user data.

10. The vehicle of claim 7, wherein the display characteristic synchronizes the mobile display preferences with vehicle display preferences of the vehicle graphical user interface.

11. The vehicle of claim 7, wherein the machine learning model is a generative artificial intelligence model.

12. The vehicle of claim 7, wherein the display characteristic includes one or more of a font style of the vehicle graphical user interface, or a menu of the vehicle graphical user interface.

13. A method comprising:

receiving first user data from an application of a mobile device;

identifying that the application is associated with a vehicle;

identifying mobile display preferences of the application from the first user data, wherein the mobile display preferences include a background style of the mobile device including a mobile background selected by a user;

identifying second user data that indicates a location of the vehicle;

generating, with a machine learning model, a parameter based on the first user data and the second user data by generating a new vehicle background for a vehicle graphical user interface of the vehicle based on the background style, the mobile background and the location, wherein the parameter is associated with a display characteristic that controls a presentation of the new vehicle background on the vehicle graphical user interface, wherein the new vehicle background is different from the mobile background; and providing the parameter to the vehicle based on the application being associated with the vehicle.

14. The method of claim 13, wherein the second user data further includes one or more of weather associated with the vehicle, a speed of the vehicle, a physical characteristic of the vehicle, a time associated with the vehicle, an illumination associated with the vehicle, a temperature associated with the vehicle, a driving condition of the vehicle, a season associated with the vehicle, or biometric data associated with a user.

15. The method of claim 13, further comprising:

receiving third user data that is a characteristic of an occupant of the vehicle; and wherein the generating includes generating the parameter based on the third user data.

16. The method of claim 13, further comprising:

setting the display characteristic to synchronize the mobile display preferences with vehicle display preferences of the vehicle graphical user interface.

17. The method of claim 13, wherein the machine learning model is a generative artificial intelligence model, and wherein the display characteristic further includes one or more of a font style of the vehicle graphical user interface, or a menu of the vehicle graphical user interface.

18. The computing system of claim 1, further comprising:

at least one vehicle processor of the vehicle; and at least one vehicle memory of the vehicle having a set of instructions, which when executed by the at least one vehicle processor, causes the vehicle to:

display the new vehicle background on the vehicle graphical user interface.

19. A system comprising:

the vehicle of claim 7; and a server comprising a memory and processor that executes the machine learning model to generate the new vehicle background.

20. The method of claim 13, further comprising:

displaying the new vehicle background on the vehicle graphical user interface.

* * * * *